May 9, 1967 B. E. DENTON 3,319,113

EFFICIENCY CIRCUIT

Filed March 23, 1964 2 Sheets-Sheet 1

INVENTOR.
BETHEL E. DENTON
BY
W. H. Sprague
Attorney

EFFICIENCY CIRCUIT

Filed March 23, 1964 2 Sheets-Sheet 2

INVENTOR.
BETHEL E. DENTON
BY
W. H. Sprowagle
Attorney

United States Patent Office 3,319,113
Patented May 9, 1967

3,319,113
EFFICIENCY CIRCUIT

Bethel E. Denton, Henderson County, Ky., assignor to Radio Corporation of America, a corporation of Delaware Filed Mar. 23, 1964, Ser. No. 353,966
3 Claims. (Cl. 315—29)

This invention relates to circuit arrangements for providing electromagnetic deflection of an electron beam in the picture tube of a television receiver. More particularly, the invention relates to an improvement in an efficiency circuit which is utilized in an output stage of a deflection system of the television receiver.

Television receiving apparatus includes a horizontal deflection system for causing periodic deflection of an electron beam in a picture tube of the apparatus. An output stage of the deflection system generates a current of generally sawtooth waveform in a deflection winding and thereby establishes a varying electromagnetic field for deflecting the electron beam. The output stage includes an amplifying device and a transformer for coupling the deflection winding to the amplifying device. This stage is adapted to operate with relative efficiency in accordance with well-known reaction scanning principles, and for this purpose a damper diode is coupled to a winding on the transformer and is arranged for recirculating electrical energy in the deflection winding during a trace interval of a deflection cycle. For further increasing the efficiency of operation of the receiver, it is the practice in the art to provide a B-boost capacitor coupled in the output stage in a manner for deriving energy from the stage during the trace interval and for subsequently restoring this energy to the receiver.

The need has been recognized for increasing the trace linearity of the electron beam which is being deflected. Therefore, means are generally provided in the receiving apparatus for reducing trace non-linearities in the scanning electron beam.

One form of output stage includes an L-C efficiency network which functions both to establish a B-boost voltage for the receiver and to increase the linearity of scan. An inductor and two capacitors are provided and are arranged to form a network which is resonant at a frequency approximately equal to the scanning frequency, $f_h$. An electrode of the damper diode, an anode of the output amplifying device, and a source of direct current operating potential are coupled to the network in a manner both for controlling the flow of current in the diode during a trace interval and thereby correcting non-linearities and for establishing a B-boost voltage across the capacitors.

The efficiency network is common both to a circuit in the output stage which oscillates during a part of the deflection cycle and to the amplifying device. These circuits have differing requirements with respect to the impedance presented to them by the efficiency network. On the one hand, the network and diode provide a load impedance which damps the oscillating circuit in a manner for effecting desired deflection current wave shaping during a beginning portion of the trace interval. This value of load impedance is generally on the order of 10 to 30 ohms. On the other hand, the network operates as a source of a boosted direct current operating potential for the output amplifying device and accordingly a source impedance lower than the damping impedance is desirable.

These requirements are partially satisfied by the circuit arrangement itself. The efficiency network presents different impedances to the oscillating circuit and to the amplifying device. During a first portion of the trace interval, the amplifying device is cutoff and the efficiency network and diode comprise a series connected load impedance for the oscillating circuit. The network during this interval appears to the oscillating circuit as a parallel circuit arrangement wherein a branch is formed by a first of the network capacitors. During a later portion of the same trace interval, the amplifying device conducts anode current and the network similarly appears as a parallel circuit arrangement forming a part of a load impedance for the amplifying device. However, because of the circuit arrangement, a branch of the parallel network circuit is formed by the second network capacitor, rather than the first network capacitor. The efficiency network therefore represents a circuit of differing impedance for the amplifying device and the oscillating circuit.

In known circuit arrangements, the different impedances provided by the network are determined to a large extent by properly selecting the network capacitors. Since the efficiency network is common to both the oscillating circuit and the amplifying device, the impedances are inter-dependent and the capacitors are therefore selected to provide an impedance for each circuit which is a compromise in view of the inter-dependence. In apparatus where the deflection energy level is relatively large, such as in television receivers employing wide angle picture tubes and in color television receivers, it is desirable that the circuit operate with relatively high efficiency. Hence, it is desirable that the aforementioned impedances more closely approach values which are best suited for operation of the associated circuit and which contribute to increased circuit efficiency.

Accordingly, it is an object of this invention to provide an improved efficiency network arrangement of the type referred-to for use in the horizontal deflection stage of a television receiver.

Another object of this invention is to provide a more desirable load impedance for the oscillating circuit and a more desirable B-boost impedance for the output amplifying device than has heretofore been provided.

Small variations in the capacity of the network capacitors cause corresponding variations in the aforementioned impedances and these variations disadvantageously affect the loading, linearity of the deflection, and the efficiency of operation. Consequently, close tolerance capacitors have been utilized to reduce this adverse affect.

A further object of the invention is to provide an efficiency circuit arrangement which eliminates a previously required use of close tolerance components in the efficiency network.

In accordance with the present invention, a horizontal deflection stage for a television receiver includes a deflection winding, an output amplifying device, an output transformer for intercoupling the winding and the amplifying device and a damper diode coupled to the winding. An efficiency network having a linearity inductor and first, second, and third capacitors coupled to the inductor is provided. The first and second capacitors are coupled respectively to first and second terminals of the inductor while the third capacitor is coupled between these terminals. The efficiency network is coupled to the transformer winding, to an electrode of the damper diode, and to a source of direct current operating potential in a manner adapted for shaping a portion of a trace segment of a sawtooth current waveform which is generated by the output stage, for deriving energy from the deflection circuit and establishing a B-boost voltage, and for varying the conduction of the diode in accordance with the flow of current in an electrode of the amplifying device. The third capacitor advantageously reduces the inter-dependence between impedances presented by the network to an oscillating circuit in the output stage and to the amplifying device. These impedances are therefore adapted for more efficient circuit operation than has been provided heretofore.

These and other features of the invention will become apparent with reference to the following specifications and drawings in which.

Figure 1:
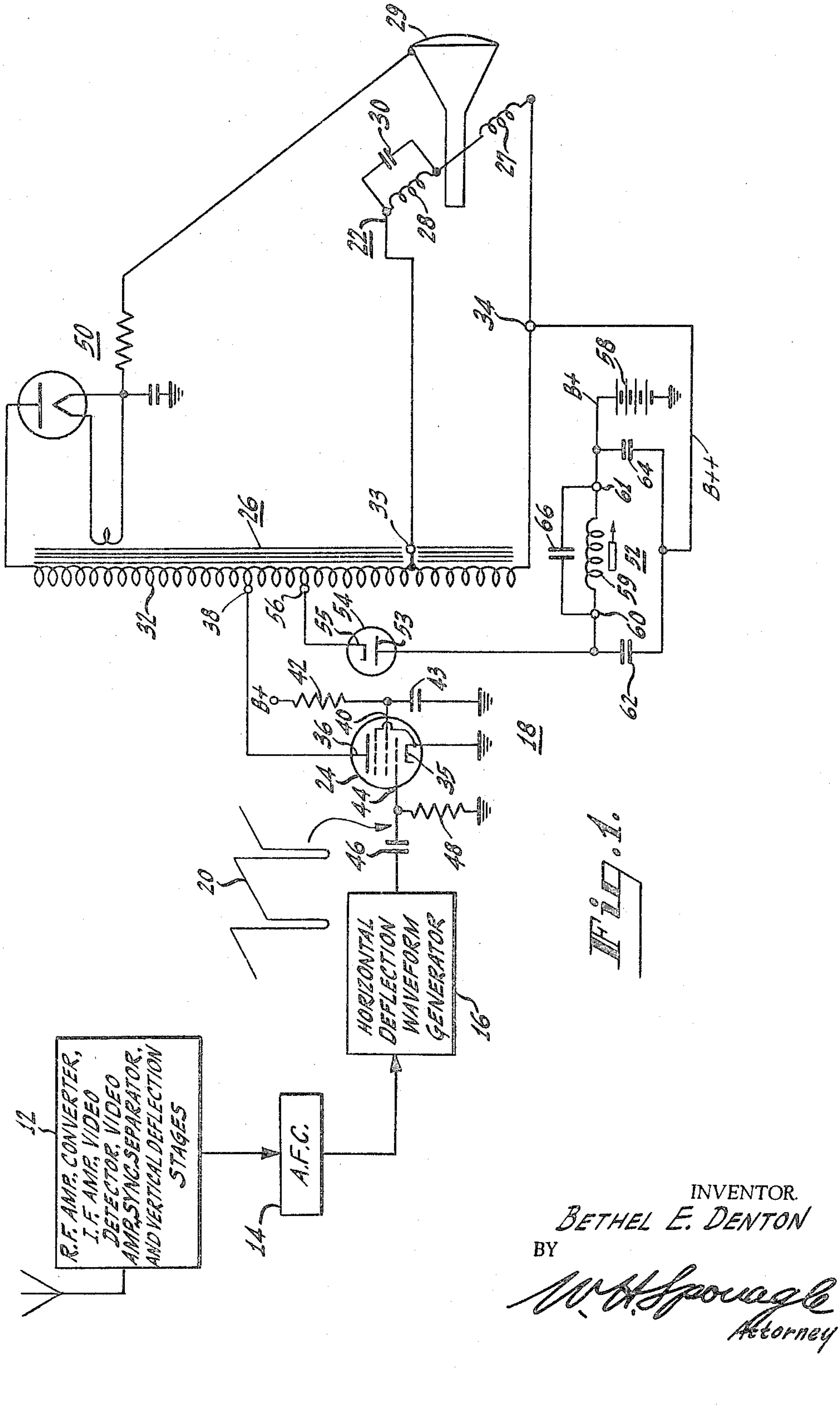
FIGURE 1 is a diagram, partly in block and partly in schematic form, illustrating a television receiving apparatus utilizing an embodiment of the present invention.

Reference is now made to FIGURE 1, for a more detailed explanation of an embodiment of the present invention. The television receiver illustrated therewith includes a radio frequency amplifier, a converter, an intermediate frequency amplifier, a video detector, a video amplifier, a synchronizing signal separator, and a vertical deflection stage. These stages, which are indicated generally by a block 12 are conventional and further elaboration is believed unnecessary. For simplifying the discussion, various other stages of a television receiver which are deemed unnecessary for a complete understanding of the present invention are not included in the diagram of FIGURE 1. The receiver includes a horizontal deflection system having an automatic frequency control stage represented by the block 14, a horizontal deflection waveform generator represented by the block 16, and a horizontal output stage indicated generally as 18. A horizontal synchronizing signal is derived from the synchronizing signal separator stage of block 12 and is coupled to the automatic frequency control stage 14. This latter stage is conventional and is adapted to generate a direct-current voltage for providing synchronization of the waveform generator 16 with other stages of the receiver. The generator 16 is conventional and may comprise apparatus such as a multivibrator or blocking oscillator adapted to generate a waveform 20, which is suitable for driving an amplifying device in the output stage 18.

The output deflection stage 18 for the receiver includes a deflection winding 22, an amplifying device 24, and an autotransformer 26 for intercoupling the deflection winding and the amplifying device. The deflection winding 22 comprises coils 27 and 28, which are positioned about a neck of a picture tube 29 and are adapted to electromagnetically deflect the one or more electron beams of the tube when a current having a sawtooth waveform flows in the coils. A capacitor 30 is connected across the coil 28 for suppressing undesired oscillations in the winding 22 caused by unbalanced circuitry. The winding 22 is coupled to a winding 32 of the transformer 26 at terminals 33 and 34.

The output amplifying device 24 is a pentode and includes a cathode electrode 35 which is connected to D.C. ground potential and an anode electrode 36 which is connected to a terminal 38 on the transformer winding 32. A direct current operating potential is applied to a screen electrode 40 of the pentode by a resistor 42, and a capacitor 43, bypasses the screen to ground. The desired input deflection waveform 20 is applied to a control electrode 44 by an RC grid-leak bias arrangement comprising the capacitor 46 and resistor 48. A conventional high voltage circuit arrangement which is also coupled to the winding 32 and which is indicated generally as 50 provides a relatively high direct-current electron beam accelerating potential for the picture tube 29.

An efficiency network, indicated generally as 52, is provided and is coupled to an anode electrode 53 of a damper diode 54, to a source of direct current operating potential 58, and to the winding 32. A cathode electrode 55 of the diode is connected to a terminal 56 of the transformer winding 32. As indicated in detail hereinafter, the circuit is arranged in a manner for both controlling the trace linearity of a scanning electron beam in the picture tube 29 and for establishing a B-boost voltage. The efficiency network 52 includes a linearity inductor 59 having first and second terminals 60 and 61 respectively, first and second capacitors 62 and 64 respectively connected to the inductor 69, and a third capacitor 66 connected in parallel with the linearity inductor 59. The capacitors 62 and 64 are connected respectively to the terminal 60 and 61 and the third capacitor is connected between these terminals.

Figure 4:
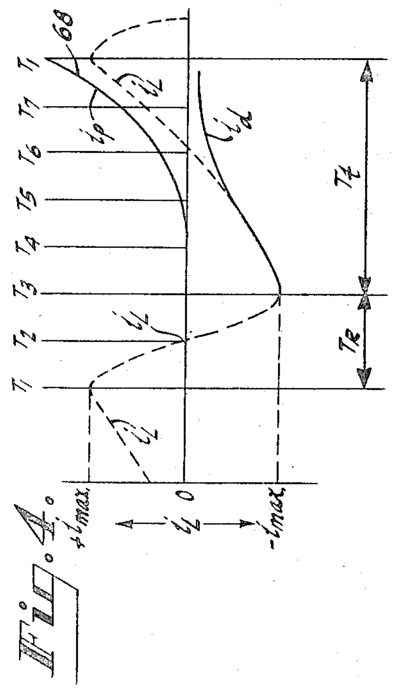
FIGURE 4 is a diagram of the current flowing in the output stage.
Figure 2:
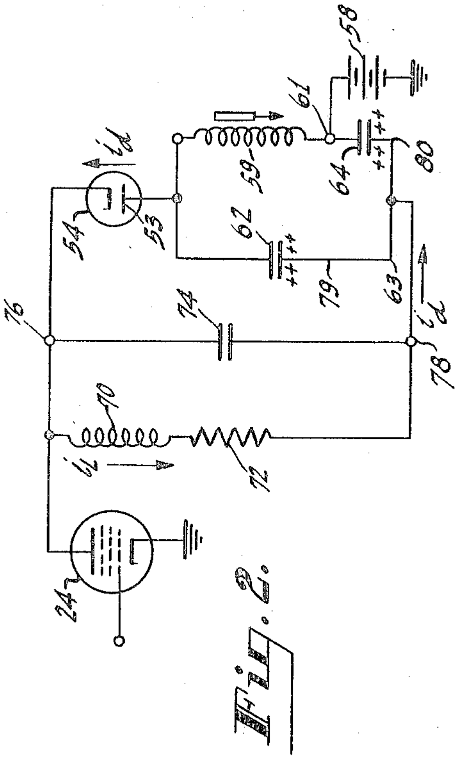
FIGURE 2 is a simplified diagram of a prior art efficiency network arrangement illustrating the impedance which the network presents to the output stage during a portion of a trace interval of the deflection cycle.
Figure 3:
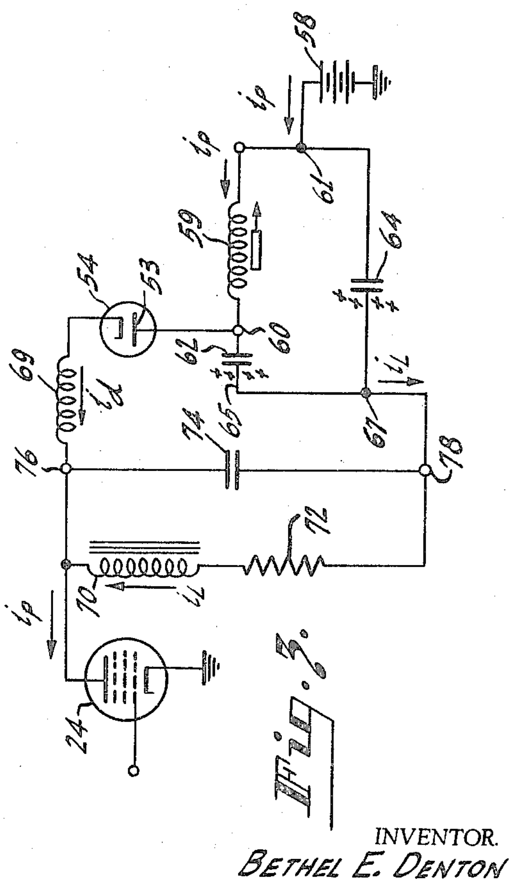
FIGURE 3 is a simplified diagram of a prior art efficiency network arrangement illustrating the impedance which the network presents to the output stage during another portion of a trace interval of the deflection cycle.

The output stage operates in accordance with well-known reaction scanning principles. For a brief description of the operation of an output stage utilizing a prior art efficiency network, reference is now made to FIGURES 2, 3, and 4. Components of the output stage of FIGURES 2 and 3 which function in a similar manner to components of FIGURE 1 are given the same reference numerals. During a period $T_5$ to $T_1$ (FIGURE 4) of a trace interval $T_t$, anode current $i_p$ flows in the amplifier device 24 and in a portion of the transformer winding 32. The waveform of this current is illustrated by the curve 68 in FIGURE 4. At a time $T_1$, the voltage waveform 20 (FIGURE 1), at the control electrode 44 of the amplifying device rapidly changes in a manner for causing the anode current $i_p$ to cut off. As is well known, the circuit comprising deflection winding 22 and the transformer 26 forms a resonant circuit having a frequency of natural resonance which is on the order of 4 to 5 times the horizontal deflection frequency, $f_h$. The resonant circuit referred to as the oscillating circuit, is represented in FIGURES 2 and 3 by an equivalent inductance 70, an equivalent resistance 72, and an equivalent capacitance 74. Electrical energy is stored in the electromagnetic field of the equivalent inductance 70 at time $T_1$. As the device 24 is cut off, this energy causes the equivalent circuit to oscillate at its natural resonant frequency. One half of a cycle of oscillation occurs during a retrace interval $T_r$ (FIGURE 4). During this interval the energy transfers to an electrostatic field of the capacitance 74 at time $T_2$, and successively to an electromagnetic field of reversed polarity in the inductor 70 at time $T_3$. During this same interval, a voltage, not illustrated, is developed between points 76 and 78 in the circuit of FIGURE 2. This voltage has an amplitude and a polarity which causes the diode 54 to be back-biased and inhibits current flow in the diode. At time $T_3$, however, the voltage between points 76 and 78 causes the diode to become forward-biased and current flows in the diode. A load impedance provided by the diode 54 and the efficiency network overdamps the oscillating circuit, inhibits further oscillation and helps to shape the diode current $i_d$ during the trace interval $T_3$ to $T_1$.

The efficiency network of FIGURES 2 and 3 substantially comprises a reactive impedance load and the energy in the field of inductor 70 at time $T_3$ therefore can be dissipated only in the equivalent resistance 72. Since this resistance is relatively small, a large part of the energy is stored in the reactive components of the efficiency network. During the interval $T_3$ to $T_1$ a current $i_d$ flows in branches 79 and 80 of the efficiency network of FIGURE 2 and causes the capacitors 62 and 64 to charge with a porality as indicated. The capacitors 62 and 64 were initially charged by the B+ voltage source 58 when the circuit was placed in operation. This additional flow of charging current therefore provides a B-boost voltage at point 78 in the circuit. At approximately time $T_5$, the voltage waveform 20 (FIGURE 1) causes the amplifier device 24 to again conduct anode current $i_p$. As shown in FIGURE 4 the current $i_p$ combines with the diode current $i_d$ to provide a composite deflection coil current $i_L$ over the interval $T_t$. This current $i_L$ which flows in the winding 22 has a generally sawtooth waveform. The current $i_p$ is partially supplied by the capacitors 62 and 64 which restore energy to the circuit during the interval $T_5$ to $T_1$. At time $T_1$, the amplifying device is once again cut off and the deflection cycle is repeated.

A trace linearity correction of a scanning electron beam is effected by controlling the rate of change in the flow of the currents $i_p$ and $i_d$. As the amplifying device 24 conducts current at about time $T_5$, a portion of the anode current $i_p$ flows through the inductor 59 and capacitor 62. The current flow in inductor 59 establishes a voltage at the anode electrode 53 of diode 54 which controls the flow of current in the diode. By suitably selecting the inductor 59, a desired voltage is generated at the anode 53 and a combination of the currents $i_p$ and $i_d$ is provided which corrects for non-linearities in the trace of the scanning beam.

As indicated previously, the efficiency network represents a source of energy and accordingly the impedance which it presents to the amplifying device is to be desirably low whereas the impedance which the network presents to the oscillating circuit is to be desirably relatively higher. As shown in FIGURE 2, the load impedance presented to the oscillating circuit includes the branch 80 comprising the series coupled capacitor 64 and inductor 59 in parallel with the branch 79 comprising the capacitor 62. As shown in FIGURE 3 the impedance presented to the amplifying device comprises a parallel circuit in series with the source 58. The parallel circuit includes a branch 65 comprising the series coupled capacitor 62 and inductor 59 in parallel with a branch 67 comprising the capacitor 64. A D.C. circuit also exists for the amplifying device when the device is conducting current. The D.C. circuit may be traced in FIGURE 3 from the source of D.C. potential 58, through the linearity inductor 59, through the diode 54, through an inductance 69 which represents a portion of the transformer winding 32, through the amplifying device 24, and return to the source 58 via a ground circuit.

It can be seen in FIGURES 2 and 3 that the capacitors 62 and 64 alternate as shunt capacitors in the two described parallel circuits formed by the efficiency network and presented respectively to the oscillating circuit and the amplifying device. In view of this arrangement and since a D.C. load impedance is also provided for the amplifying device, this circuit arrangement itself partially provides for the desired different load impedances for the oscillating circuit and for the amplifying device. It is desirable that the capacitance 64 which is arranged in series with the inductor 59 in the branch 80 of FIGURE 2 have a relatively low value of capacity with respect to the capacitor 62. It is also desirable that the capacitance 62 which is arranged in series with the inductor 59 in the branch 65 of FIGURE 3 have a relatively low value of capacity with respect to the capacitor 64. These requirements are contrary since in the one instance capacitor 62 is desirably larger than capacitor 64 while in the other instance capacitor 64 is desirably larger than capacitor 62. The load impedances provided by such a prior art efficiency network are thus inter-dependent in that an efficiency network adapted for best B-boost source impedance does not provide best shaping of the current $i_d$, while an efficiency network adapted for best damping impedance for the oscillating circuit does not provide best operation of the B-boost circuit. Accordingly, a compromise is drawn and the capacitors 62 and 64 are selected to adequately satisfy the circuit requirements of both the oscillating circuit and the amplifying device.

Figure 5:
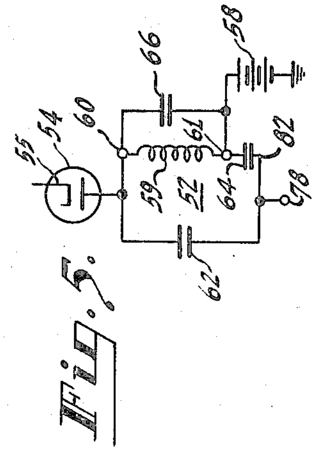
FIGURE 5 is a diagram of the efficiency network of FIGURE 1 arranged for illustrating the impedance presented to the output stage during a portion of the deflection cycle.

In FIGURE 1, a novel efficiency circuit arrangement is illustrated which advantageously reduces the aforementioned interdependence of impedances and provides for a more desirable B-boost impedance and a more desirable damping impedance for the oscillating circuit than has heretofore been provided by prior art arrangements. The efficiency circuit arrangement 52 of FIGURE 1 is redrawn in FIGURES 5 and 6 in a manner similar to FIGURES 2 and 3 respectively in order to illustrate the impedances presented to the oscillating circuit and to the amplifying device. A third capacitor 66 is shown connected in parallel with the linearity inductor 59. This capacitor functions to reduce the effective capacity in a branch 82, FIGURE 5, and in a branch 84, FIGURE 6. When the network loads the oscillating circuit, the magnitude of the effective capacity in series with the inductor 59 is reduced by the capacitor 66 since the effective series capacitance, $C_{82}$, of branch 82 in FIGURE 5 is:

$$C_{82}=\frac{C_{66}\times C_{64}}{C_{66}+C_{64}}$$

Figure 6:
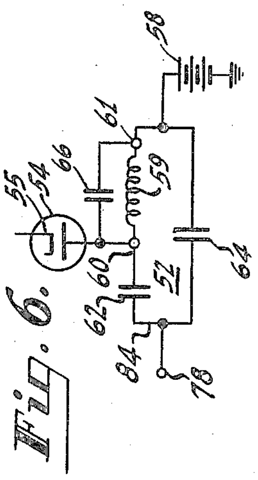
FIGURE 6 is a diagram of the efficiency network of FIGURE 1 arranged for illustrating the impedance presented to the output stage during another portion of the deflection cycle.

When the amplifying device conducts current, the full capacitance of capacitor 64 is presented to the amplifier in parallel with the branch 84, FIGURE 6, while the effective series capacitance, $C_{84}$, in the branch 84 is less than the capacity 62 in accordance with the relation:

$$C_{84}=\frac{C_{66}\times C_{62}}{C_{66}+C_{62}}$$

The capacitor 62 is selected for providing in conjunction with the inductor 59, a desired damping load for the oscillating circuit while the capacitor 64 is selected for providing a desired low B-boost impedance. The added use of capacitor 66 therefore provides an efficiency network which can more closely satisfy the impedance requirements of the two circuits to which it is commonly coupled.

Thus, an improved efficiency circuit has been described which presents impedances to an oscillating circuit in the output stage and to an amplifying device in the output stage, which are more suitable with regard to their respective operations, and which improve the operating efficiency of the output stage and eliminate the need for providing close tolerance components.

While it will be understood that the value of circuit components for the efficiency network of this invention may vary in order to fit individual requirements, the following circuit parameters have been found to provide satisfactory operation and are included herein only by way of example as follows:

Picture tube 29: 21FJP 22
Amplifying device 24: 6JE6
Damper diode 54: 6DW4
Transformer 26: Type RCA XD3708-22
Turns measured from terminal 34:
- To terminal 33—377
- To terminal 56—459
- To terminal 38—739

Deflection winding 22: Inductance—118 mh. (unloaded)
Linearity inductor 59: Inductance—0.5 mh. to 1.3 mh.
Capacitors:
- 30—100 $\mu\mu$fd.
- 43—0.1 $\mu$fd.
- 46—.01 $\mu$fd.
- 62—.022 $\mu$fd.
- 64—.033 $\mu$fd.
- 66—.068 $\mu$fd.

Resistors:
- 42—13K ohm
- 48—1.5 megohm

B+ voltage source 58: 405 volts D.C.
B++ voltage: 810 volts D.C.

While there is illustrated, described and pointed out in the annexed claims certain novel features of the invention, it will be understood that various omissions, substitutions, and changes in the forms and details of the system illustrated may be made by those skilled in the art without departing from the spirit of the invention and the scope of the claims.

What is claimed is:

1. In a television receiver, a deflection circuit comprising
   a deflection output amplifying device,
   a deflection winding,
   a transformer coupling said deflection winding to said amplifying device,
   a source of operating potential,
   a unilaterally conductive damping device coupled to said transformer,
   an efficiency network, said network comprising the series combination of an inductance and a first capacitance coupling said damping device and at least a portion of said transformer in series relation, a second capacitance coupled across said series combination and a third capacitance coupled across said inductance.

2. In a television receiver, a deflection circuit comprising
   a deflection output amplifying device,
   a deflection winding,
   a transformer coupling said deflection winding to said amplifying device,
   a unilaterally conductive damper diode,
   a boost capacitor coupling said diode across at least a portion of said transformer,
   a series combination of an efficiency inductance and a series capacitance coupled across said boost capacitor,
   a parallel capacitance coupled across said efficiency inductance and
   a source of operating potential coupled to the junction between said efficiency inductance and said series capacitance.

3. In a television receiver, a deflection circuit comprising
   an autotransformer comprising a winding having a high voltage end terminal, a low voltage end terminal and a plurality of taps intermediate said end terminals,
   a deflection output amplifying device having at least an anode coupled to one of said taps and a cathode coupled to a reference potential,
   a deflection winding coupled between one of said taps and said low voltage end terminal,
   a unilaterally conductive damper diode having a cathode coupled to one of said taps and an anode,
   a boost capacitor coupled between said anode of said diode and said low voltage end terminal,
   a source of operating potential,
   an efficiency inductance coupled between said source of operating potential and said anode of said diode,
   a series capacitance coupled between said low voltage end terminal and the junction between said inductance and said source, and
   a parallel capacitance coupled across said inductance.

References Cited by the Examiner

UNITED STATES PATENTS 2,536,839 1/1951 Clark ---------------- 315—27

DAVID G. REDINBAUGH, *Primary Examiner.*

JOHN W. CALDWELL, *Examiner.*

T. A. GALLAGHER, *Assistant Examiner.*